UNITED STATES PATENT OFFICE.

FREDERICH OTTO KAEMPF, OF TORONTO, ONTARIO, CANADA.

METHOD OF TREATING BITUMEN OR BITULITHIC MATERIALS.

1,077,081. Specification of Letters Patent. Patented Oct. 28, 1913.

No Drawing. Application filed October 25, 1906. Serial No. 340,485.

*To all whom it may concern:*

Be it known that I, FREDERICH OTTO KAEMPF, a subject of the Emperor of Germany, residing at Toronto, in the Province of Ontario and Dominion of Canada, have invented certain new and useful Improvements in Methods of Treating Bitumen or Bitulithic Materials; and I do hereby declare the following to be a full, clear, and exact description of the invention, such as will enable others skilled in the art to which it appertains to make and use the same.

My invention has for its object to provide an improved process of softening and thereafter hardening bitumen such as asphalt, rock asphalt, tar, tar pitch, old or hitherto used bitulithic pavements, without the application of heat thereto, and to this end the improved method consists of the novel treatment hereinafter described and defined in the claim. Hitherto, in preparing such bitumen or bitulithic substances, preparatory to using the same in the making or repairing of pavements or roads or roofs, or similar coverings, or for other purposes, such as the making of briquets, or bricks for paving, building or other purposes, it has been necessary to first heat the same in order to make such material soft or plastic, as well as any mineral matter to be incorporated with the same, and then to almost immediately use or give final form to the same while still hot. This requirement of very quick use after heating has necessitated the employment of portable heating plants or boilers, or other suitable apparatus, before the work could be performed.

In accordance with my invention, I grind, pulverize, or otherwise finely divide the bitumen or bitulithic material, either pure or mixed with mineral matter, by hand or by suitable machinery, and soften the same by a fluid mixture of water and a heavy oil, (either mineral, vegetable or animal) which oil is soluble or is capable of being emulsified in water, or, more generally stated, is held in suspension in the water. For instance, a liquid, oily substance, known on the market as Westrumite, will form an emulsion in water, and an oil known as Boleg oil is capable of forming a solution with water, and either of these two, as well as others, may be used in my improved process, but the former forms the cheaper of the two liquid, oily substances. The water, with the oil held in suspension thereby, should be thoroughly commingled with the bitumen and, when thus commingled, will soften the same without the application of heat. The water acts as a carrying agent to distribute the finely divided particles of the oily substance evenly throughout the granulated or crushed bitumen and, when the water has evaporated, the heavy, oily substance is left in the bitumen as a binder, which in itself, as well as by softening the bitumen, serves to cement the material into a substantially homogeneous mass. Several days time will usually be required to permit the water to evaporate and the body of the bitumen and the binder to harden, so that said material will remain for some time in plastic condition and, hence, it may be transported and thereafter applied to roadbeds or molded into various forms, such as bricks or briquets. The bitumen thus treated may be used pure on in connection with sand, stone, cement, etc.

The percentage of soluble oil which should be used depends on the composition of the material to be used. For example, ninety per cent. of pulverized old asphalt pavement mixed with ten per cent. to fifty per cent. more or less of a solution of soluble oil and water and compressed after it is soaked thoroughly, will give a compact mass. The time required for the material to harden will, of course, depend largely on the nature of the bitumen and the amount of soluble oil or softener employed, and the weather conditions.

What I claim is:

The process of treating bitumen or bitulithic substances, which consists in pulverizing, grinding or otherwise mechanically finely dividing the same, in softening thereafter the same by the application thereto of a liquid consisting of water and a heavy oil, which oil is capable of forming an emulsion with the water and is held in a finely divided state in suspension thereby, and in giving the bitumen or bitulithic substance thus treated the desired form and allowing the same to harden by permitting the water to evaporate therefrom and the oily substance to remain commingled therewith, substantially as described.

In testimony whereof I affix my signature in presence of two witnesses.

F. OTTO KAEMPF.

Witnesses:
R. S. CHILTON, Jr.,
E. MERNER.